(12) United States Patent
Ma et al.

(10) Patent No.: US 11,822,203 B2
(45) Date of Patent: Nov. 21, 2023

(54) DISPLAY PANEL, CONTROL METHODS THEREOF, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qingqing Ma, Beijing (CN); Shuo Li, Beijing (CN); Chao Tian, Beijing (CN); Zhe Wang, Beijing (CN); Xiang Yuan, Beijing (CN); Wenyuan Xi, Beijing (CN); Yinan Gao, Beijing (CN); Rui Xu, Beijing (CN); Min Wang, Beijing (CN); Fang Zhang, Beijing (CN); Qidong Sun, Beijing (CN); Shaoru Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/652,385

(22) PCT Filed: Jun. 25, 2019

(86) PCT No.: PCT/CN2019/092740
§ 371 (c)(1),
(2) Date: Mar. 30, 2020

(87) PCT Pub. No.: WO2020/186649
PCT Pub. Date: Sep. 24, 2020

(65) Prior Publication Data
US 2021/0405496 A1    Dec. 30, 2021

(30) Foreign Application Priority Data

Mar. 20, 2019   (CN) .......................... 201910213826.9

(51) Int. Cl.
G02F 1/1676  (2019.01)
G02F 1/167   (2019.01)
G02F 1/1685  (2019.01)

(52) U.S. Cl.
CPC ............ G02F 1/1676 (2019.01); G02F 1/167 (2013.01); G02F 1/1685 (2019.01)

(58) Field of Classification Search
CPC ...... G02F 1/167; G02F 1/1345; G02F 1/1677; G02F 1/1681; G02F 1/13452;
(Continued)

(56) References Cited

U.S. PATENT DOCUMENTS

2002/0015127 A1* 2/2002 Hagiwara ............. G02F 1/1345
349/149
2013/0050805 A1* 2/2013 Kim ........................ G02F 1/167
359/296

(Continued)

FOREIGN PATENT DOCUMENTS

CN   1499460 A    5/2004
CN   104076569 A  10/2014
(Continued)

OTHER PUBLICATIONS

ISA National Intellectual Property Administration of the People's Republic of China, International Search Report and Written Opinion Issued in Application No. PCT/CN2019/092740, dated Jan. 2, 2020, WIPO, 12 pages.
(Continued)

Primary Examiner — Brandi N Thomas
(74) Attorney, Agent, or Firm — McCoy Russell LLP

(57) ABSTRACT

A display panel and control methods thereof are provided. In one example, the display panel includes, a first substrate and
(Continued)

a second substrate opposite to each other, and a solution encapsulated between the first substrate and the second substrate. In some examples, the solution includes opaque charged particles. In some examples, the first substrate includes a first electrode, the first electrode including a plurality of discrete sub-electrodes, and the second substrate includes a second electrode. Further, the control method may include adjusting an electric field between each of the plurality of discrete sub-electrodes and the second electrode, causing the opaque charged particles to undergo a gathering motion or a scattering motion.

19 Claims, 9 Drawing Sheets

(58) Field of Classification Search
CPC .............. G02F 1/1676; G02F 1/1339; G02F 1/133342; G02F 1/133512; G02F 1/1341; G02F 1/1679; G02F 1/1343; G02F 1/16757; G02F 1/133305; G02F 1/16756; G02F 2201/122; G02F 2202/36; G02F 2203/026; G02F 1/133555; G02F 1/134363; G02F 1/13456; G02F 1/16762; G02F 2201/121; G02F 1/1309; G02F 1/1333; G02F 1/133308; G02F 1/133311; G02F 1/133354; G02F 1/13338; G02F 1/133388; G02F 1/133553; G02F 1/133631; G02F 1/1337; G02F 1/133753; G02F 1/134309; G02F 1/134381; G02F 1/136277; G02F 1/16753; G02F 1/16755; G02F 1/16761; G02F 1/1685; G02F 2201/34; G02F 2201/38; G02F 2201/54; G02F 2202/025; G02F 2202/28; G02F 2203/02; G02F 1/133509; G02F 1/13392; G02F 1/13394; G02F 1/13454; G02F 1/1368; G02F 2001/1678; A61B 2562/0215; A61B 5/0205; A61B 5/259; A61B 5/341; A61B 5/361; A61B 5/364; A61B 5/4818; A61B 5/6833; A61B 5/746; G09G 3/344; G09G 2320/0252; G09G 2300/0426; G09G 2300/0439; G09G 2300/0465; G09G 2310/063; G09G 2320/0223; G09G 2380/04; G09G 3/16; G09G 3/3648; G09G 2300/0434; G09G 3/3446

See application file for complete search history.

(56) References Cited

U.S. PATENT DOCUMENTS

| | | | |
|---|---|---|---|
| 2015/0198857 A1 | 7/2015 | Yashiro et al. | |
| 2015/0241754 A1* | 8/2015 | Du | G02F 1/167 |
| | | | 359/296 |

FOREIGN PATENT DOCUMENTS

| | | | | |
|---|---|---|---|---|
| CN | 105074560 A | 11/2015 | | |
| CN | 105590592 A | 5/2016 | | |
| CN | 106610552 A | 5/2017 | | |
| CN | 106707654 A | 5/2017 | | |
| CN | 107991825 A | 5/2018 | | |
| CN | 108303832 A | 7/2018 | | |
| CN | 109426046 A | 3/2019 | | |
| CN | 109856883 A | 6/2019 | | |
| EP | 2413184 A1 | 2/2012 | | |
| KR | 20150038806 | * | 4/2015 | G02F 1/13394 |

OTHER PUBLICATIONS

State Intellectual Property Office of the People's Republic of China, Office Action and Search Report Issued in Application No. 201910213826.9, dated Jun. 17, 2020, 15 pages. (Submitted with Partial Translation).

* cited by examiner

US 11,822,203 B2

DISPLAY PANEL, CONTROL METHODS THEREOF, AND DISPLAY DEVICE

CROSS REFERENCE TO RELATED APPLICATIONS

The present application is a U.S. National Phase of International Application No. PCT/CN2019/092740 entitled DISPLAY PANEL, CONTROL METHODS THEREOF, AND DISPLAY DEVICE and filed on Jun. 25, 2019. International Application No. PCT/CN2019/092740 claims priority to Chinese Patent Application No. 201910213826.9, filed on Mar. 20, 2019. The entire contents of each of the above-listed applications are incorporated herein by reference for all purposes.

TECHNICAL FIELD

The present description relates generally to the field of display technologies, and embodiments of a display panel, control methods thereof, and a display device.

BACKGROUND

A color-changing glass is any glass that may change color, or transmittance properties, under application of certain conditions and then may reversibly and automatically return to an initial state under reversion of said conditions. Color-changing glasses may be principally categorized into photochromic glasses, thermochromic glasses, electrochromic glasses, and force-changing glasses according to a mechanism of glass color change, where the mechanism may respectively include changes in light, temperature, electric field or current, and surface pressure.

An electrochromic glass adjusts light absorption and transmission under action of an electric field, exhibiting a reversible change in color, transparency, and appearance. The electrochromic glass is structured around an electrochromic device (ECD), where the ECD is lined by two outermost layers of glass. Further layers disposed within the electrochromic glass include a plurality of conductive layers.

SUMMARY

An embodiment of the present disclosure provides a display panel, the display panel comprising, a first substrate and a second substrate opposite to each other, and a solution encapsulated between the first substrate and the second substrate, wherein the solution comprises a transparent uncharged liquid and opaque charged particles, the first substrate comprises a first base substrate and a first electrode disposed on a side of the first base substrate closer to the solution, the first electrode including a plurality of discrete sub-electrodes, and the second substrate comprises a second base substrate and a second electrode disposed on a side of the second base substrate closer to the solution.

Further, an embodiment of the present disclosure provides a display device comprising the display panel, and further comprising a power supplying circuit.

Further, an embodiment of the present disclosure provides a method for controlling the display panel, comprising adjusting the voltage of each of the plurality of discrete sub-electrodes and the second electrode, where the electric field generated between each of the plurality of discrete sub-electrodes and the second electrode is correspondingly adjusted to cause the opaque charged particles to undergo the gathering motion or the scattering motion to adjust the transmittance of the display panel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the summary above does not constitute an admission that the technical problems and challenges discussed were known to anyone other than the inventors.

DETAILED DESCRIPTION

The following description relates to a display panel, control methods thereof, and a display device including the display panel. The specific embodiments of the present invention will be described in detail below with reference to the accompanying figures. It is to be understood that the specific embodiments described herein are merely illustrative and not restrictive.

Figure 1:
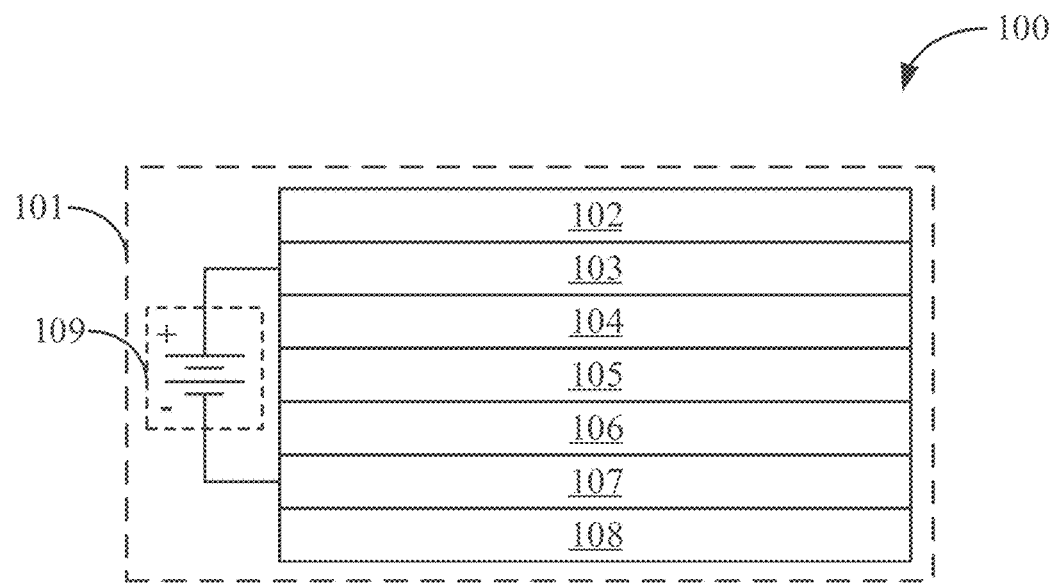
FIG. 1 shows a schematic structural diagram of a conventional electrochromic glass.

Referring now to FIG. 1, a schematic structural diagram 100 depicts a conventional electrochromic glass 101 as a first example of related art. As shown, a layered structure of the conventional electrochromic glass 101 includes, from top to bottom, a first glass, or other transparent substrate material, 102, a first transparent conductive layer 103 (such as indium tin oxide, or ITO), an electrochromic layer 104, an electrolyte layer 105, an ion storage layer 106, a second transparent conductive layer 107 (such as ITO), and a second glass, or other transparent substrate material, 108. As further shown, a battery 109 is coupled to the first transparent conductive layer 103 and the second transparent conductive layer 107 in order to apply voltage thereto.

The conventional electrochromic glass 101 may have various desirable properties over other smart glass devices, such as a wide viewing angle, a low driving voltage, and no power consumption. However, the conventional electrochromic glass 101 may also be subject to various disadvantages, such as a long response time for color changing/switching (e.g., on an order of several minutes), resulting in poor user experience. Further, the conventional electrochromic glass 101 typically includes organic materials, resulting in poor reliability across a range of environments and a short device life.

Figure 7:
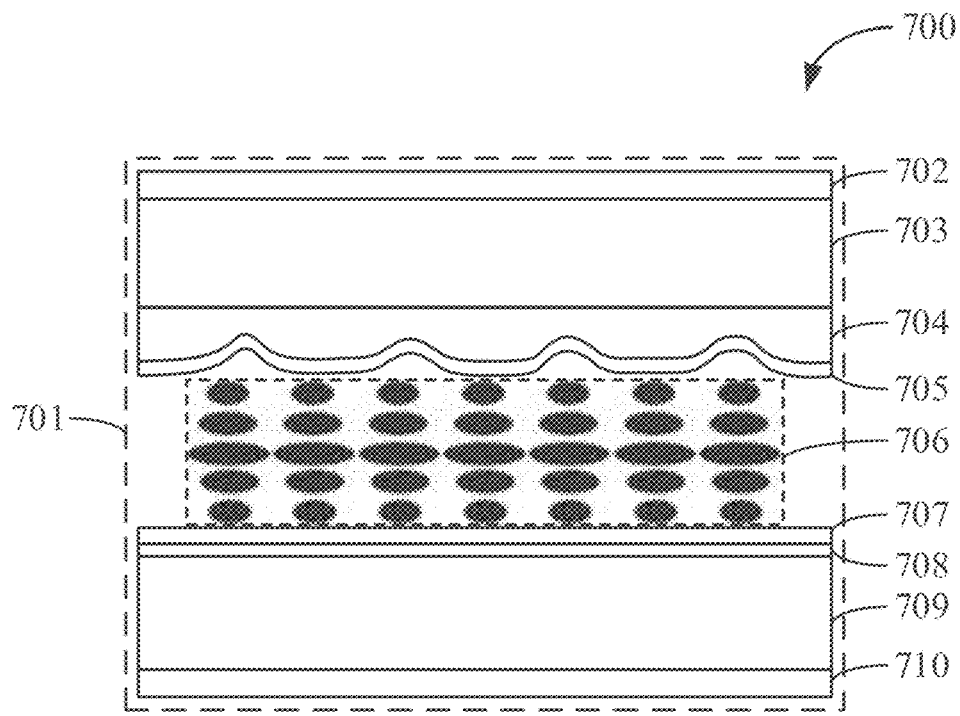
FIG. 7 shows a schematic structural diagram of a conventional dye liquid crystal color-changing glass.

Referring now to FIG. 7, a schematic structural diagram 700 depicts a conventional dye liquid crystal color-changing glass 701 as a second example of related art. As with the conventional electrochromic glass (e.g., 101) described above with reference to FIG. 1, the conventional dry liquid crystal color-changing glass typically includes organic materials, and is thus susceptible to similar issues (e.g., poor environmental reliability, short device life). As shown, a layered structure of the conventional dye liquid color-changing glass 701 includes, from top to bottom, a first polarizer 702, a color filter substrate 703 (such as ITO), a common electrode 704, a first alignment layer 705 (such as polyimide), a dye liquid crystal 706, a second alignment layer 707 (such as polyimide), a pixel electrode 708, a thin film transistor substrate 709 (such as ITO), and a second polarizer 710. A deflection angle of the dye liquid crystal 706 may be controlled by applying differing voltages to achieve correspondingly differing transparency display effects. However, such a control process results in the dye liquid crystal 706 being overexposed to ultraviolet radiation in sunlight, which may result in the short device life.

Figure 2:
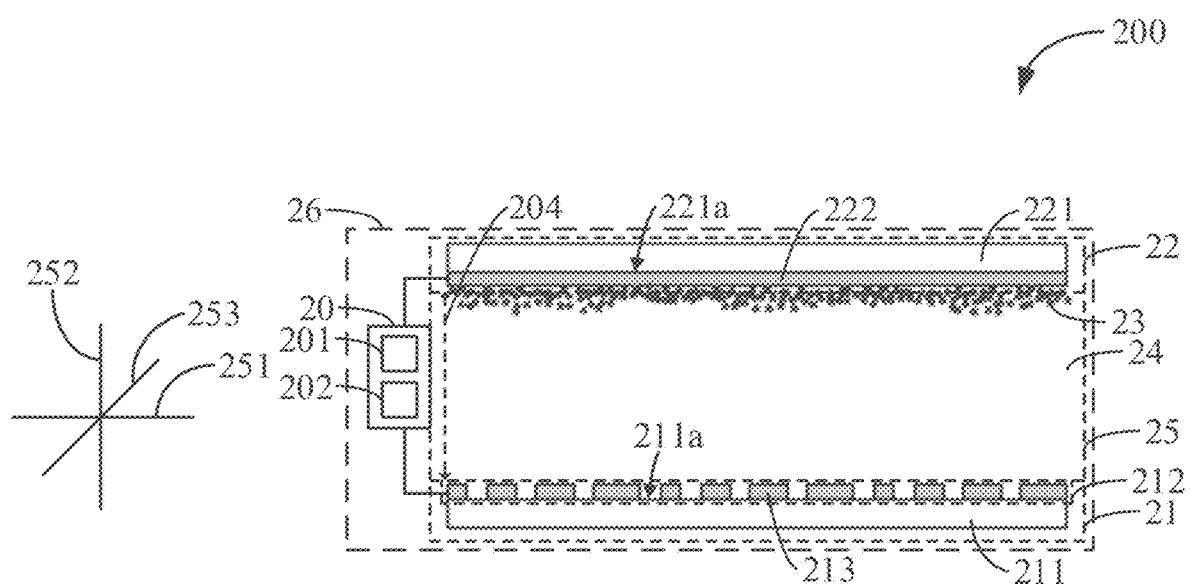
FIG. 2 shows a schematic structural diagram of a display panel in a dark state according to an embodiment of the present disclosure.

As such, and as will be described below with reference to FIGS. 2-6, a display panel is provided by an embodiment of the present disclosure. Referring now to FIG. 2, a schematic structural diagram 200 depicts a display panel 26 in a dark state. The display panel 26 may include a controller 20, a first substrate 21 and a second substrate 22 disposed opposite to each other, and a solution, or suspension, 25 disposed between the first substrate 21 and the second substrate 22. The solution 25 includes a liquid 24 and particles 23, where the liquid 24 may be uncharged and transparent and the particles 23 may be charged and opaque. Mutually perpendicular axes 251, 252, and 253 define a three-dimensional space for the schematic structural diagram 200, where the axis 251 and the axis 252 define a plane of FIG. 2 and the axis 253 is normal to the plane of FIG. 2. It will be appreciated that FIGS. 3 and 4 (described in more detail below) are depicted in the same plane as FIG. 2. It will further be appreciated that FIGS. 5 and 6 (described in more detail below) is depicted in a plane which is perpendicular to the plane of FIG. 2.

The first substrate 21 includes a first base substrate 211 and a first electrode 212, the first electrode 212 disposed on a side 211*a* of the first base substrate 211 facing the solution 25. Further, the first electrode 212 includes a plurality of discrete sub-electrodes 213. Herein, "discrete" may be used to refer to one or more components or groups of components being wholly separate from (that is, non-overlapping with) any other substantially similar components or groups of components. The second substrate 22 includes a second base substrate 221 and a second electrode 222, the second electrode 222 disposed on a side 221*a* of the second base substrate 221 facing the solution 25. The first base substrate 211 and the second base substrate 221 may be a glass substrate, for example. A material of the first electrode 212 and the second electrode 222 may be a transparent conductive material, such as ITO, for example. The second electrode 222 may be, for example, a full-surface ITO provided on the side 221*a* of the second base substrate 221.

The controller 20 is connected to each of the plurality of discrete sub-electrodes 213 and the second electrode 222. The controller 20 includes a processing unit 201 and a non-transitory memory 202 (e.g., read-only memory, random access memory). The processing unit 201 is communicatively coupled to the memory 202, which stores machine-readable instructions for executing a method for controlling the display panel 26. As such, the controller 20 is operable to execute the machine-readable instructions to adjust a voltage of each of the plurality of discrete sub-electrodes 213 and the second electrode 222, where an electric field generated between each of the plurality of discrete sub-electrodes 213 and the second electrode 222 is correspondingly adjusted to cause the opaque charged particles 23 to undergo a gathering motion or a scattering motion to adjust a transmittance of the display panel 26.

A width of each of the plurality of discrete sub-electrodes 213 may be equal or different from one another. Further, each of the plurality of discrete sub-electrodes 213 may be arranged at equal intervals from one another, or at different intervals from one another. That is, each of the plurality of discrete sub-electrodes 213 may be equal, or substantially equal, in distance from one another. For example, each interval between adjacent discrete sub-electrodes may be close enough in length to each other interval that differences in length are not detectable by human eyes. In some examples, each interval between adjacent discrete sub-electrodes may be within 5% of one another, within 10% of one another, or within 15% of one another. It will be understood that the width of each of the plurality of discrete sub-electrodes 213 and the distance between the each of the plurality of discrete sub-electrodes 213 may be selected according to a specific application, which is not limited in this embodiment.

The liquid 24 may function as a solvent such as ink, for example. In examples wherein the liquid 24 is ink, the liquid 24 may include a carrier fluid (for example, a transparent solvent), a dispersant (for example, a high-weight molecular polymer that prevents solutes such as pigment particles from agglomerating during a dispersion process), and a control agent (for example, mixed with ammonia salts, which stabilize solutes such as pigment particles).

The particles 23 may function as solutes such as monochromatic, surface-charged fine pigment particles. Such pigment particles may be, for example, a colored fine particulate material, that is, an organic or inorganic substance which is insoluble in a solvent and exhibits color in an opaque, particulate form. By applying a voltage to each of the first electrode 212 and the second electrode 222, the particles 23 may be driven to move in a direction along an electric field thereby generated. In order to avoid agglomeration of the particles 23, a surface of the particles 23 may include a polymer mixture of charged molecules and neutral molecules. In examples wherein the particles 23 are the pigment particles, a size (e.g., diameter) of the particles 23 may be greater than or equal to 10 nm and less than or equal to 1 µm. In some examples, the size of the particles 23 may range from a scale of tens of nanometers to a scale of hundreds of nanometers.

In one example, the solution 25 may be an ink (e.g., liquid 24) with charged pigment particles (e.g., particles 23), such as those developed by Color CNTRL. Specific components may include the pigment particles, a carrier fluid (for example, a transparent solvent), a dispersant (for example, a polymer to prevent pigment particle agglomerations during a dispersion process of said pigment particles), and a control agent (for example, mixed with an ammonia salt to stabilize the pigment particles). Further, a color of the pigment particles may be adjusted according to display requirements such that black, white, yellow, cyan, and magenta colors may be displayed.

The specific working process of the display panel 26 provided by this embodiment will be described below with reference to FIGS. 2-4.

As shown in the schematic structural diagram 200 of FIG. 2, in a dark state of the display panel 26, the voltage of each of the plurality of sub-electrodes 213 may be adjusted to be equivalent to the voltage of the second electrode 222 such that the particles 23 are uniformly distributed between the first substrate 21 and the second substrate 22. When discussing a distribution of the particles 23, "uniform" may be used herein to refer to an even or unbiased distribution of the particles 23 under a given set of conditions (e.g., presence of an electric field). In such an example, since the voltage of each of the plurality of discrete sub-electrodes 213 is equivalent to the voltage of the second electrode 222, no electric field is generated between each of the plurality of discrete sub-electrodes 213 and the second electrode 222. As such, the particles 23 are uniformly diffused/distributed between the first substrate 21 and the second substrate 22, and the display panel 26 assumes the dark state.

In a bright state, or transparent state, of the display panel 26, the voltage of each of at least one of the plurality of discrete sub-electrodes 213 and the second electrode 222 is adjusted to generate a positive electric field between the at least one of the plurality of discrete sub-electrodes 213 and the second electrode 222. As such, the particles 23 aggregate toward the at least one of the plurality of discrete sub-electrodes 213 under the positive electric field. As shown in FIG. 3, a schematic structural diagram 300 depicts the display panel 26 during the particle agglomeration process. Further, as shown in FIG. 4, a schematic structural diagram 400 depicts the display panel 26 in the bright state.

A direction of the positive electric field is related to one or more of a sign, dispersion, and amount of charge of the particles 23. The direction of the positive electric field is not limited in this embodiment, as long as the direction is one in which the particles 23 may be concentrated towards the at least one of the plurality of discrete sub-electrodes 213.

For example, when the particles 23 are negatively charged pigment particles, a negative voltage (e.g., −15 V) may be applied to the second electrode 222 and a positive, or ground, voltage may be applied to the at least one of the plurality of discrete sub-electrodes 213. The direction of the positive electric field thereby generated is from the first substrate 21 to the second substrate 22, such that the negatively charged pigment particles are concentrated on a surface of the at least one of the plurality of discrete sub-electrodes 213, and the display panel 26 exhibits the bright state.

Further, by controlling a number of the plurality of discrete sub-electrodes 213 to which a voltage is applied, in combination with the width of each of the plurality of discrete sub-electrodes 213, the distance therebetween, etc., a color-changing display effect with multilevel transparency may be achieved.

If an application necessitates restoration of the dark state during the bright state, the voltage applied to each of the first electrode 212 and the second electrode 222 may be shut off. As such, the particles 23 may be uniformly distributed between the first substrate 21 and the second substrate 22 to restore the display panel 26 to the dark state. Alternatively, a negative voltage may be applied to each of the first electrode 212 and the second electrode 222. That is, a negative voltage may be applied to each of the at least one of the plurality of discrete sub-electrodes 213 (included within the first electrode 212) and the second electrode 222 to generate a negative electric field. In such an example, and when the particles 23 are negatively charged, the particles 23 may rapidly diffuse under the negative electric field to restore the display panel 26 to the dark state. That is, applying the negative voltage to each of the first electrode 212 and the second electrode 222 may cause the particles 23 to rapidly scatter/spread and restore the dark state of the display panel 26 such that a response time of a multilevel transparency switching may be reduced.

Thus, in the dark state of the display panel 26, the voltages of each of the plurality of discrete sub-electrodes 213 and the second electrode 222 may also be adjusted such that a negative electric field is generated between each of the plurality of discrete sub-electrodes and the second electrode 222. As such, the particles 23 may be uniformly distributed between the first substrate 21 and the second substrate 22 under the negative electric field.

A direction of the negative electric field is related to one or more of a sign, dispersion, and amount of charge of the particles 23. The direction of the negative electric field is not limited in this embodiment, as long as the direction is one in which the particles 23 may be concentrated towards the second electrode 222. Further, the particles 23 may be eventually uniformly diffused/distributed in the direction of the negative electric field.

When the particles 23 are negatively charged and the display panel 26 is in the dark state, the voltage the first electrode 212 may be adjusted to be equivalent to the voltage of the second electrode 222, or the voltage of the first electrode 212 may be adjusted to be a low potential and the voltage of the second electrode 222 may be adjusted to be a high potential such that a negative electric field is generated. Alternatively, when the display panel 26 is in the bright state, the voltage of the at least one of the plurality of discrete sub-electrodes may be adjusted to be a high potential and the voltage of the second electrode 222 may be adjusted to be a low potential such that a positive electric field is generated.

When the particles 23 are positively charged and the display panel 26 is in the dark state, the voltage of the first electrode 212 may be adjusted to be equivalent to the voltage of the second electrode 222, or the voltage of the first electrode 212 may be adjusted to be a high potential and the voltage of the second electrode 222 may be adjusted to be a low potential such that a negative electric field is generated. Alternatively, when the display panel 26 is in the bright state, the voltage of the at least one of the plurality of discrete sub-electrodes may be adjusted to be a low potential and the voltage of the second electrode 222 may be adjusted to be a high potential such that a positive electric field is generated.

In practical applications, a magnitude of the voltage applied to each of the plurality of discrete sub-electrodes 213 and the second electrode 222 may be determined according to specific conditions, such as parameters including the amount of charge of the particles 23 and the response time. Specific values of such parameters are not limited in this embodiment.

As an example, in the display panel 26 provided in this embodiment, by adjusting the electric field generated between each of the plurality of discrete sub-electrodes 213 and the second electrode 222 (e.g., by adjusting the voltage of each of the plurality of discrete sub-electrodes 213 and the second electrode 222), the particles 23 in the solution 25 may be controlled to undergo a scattering motion such that the display panel 26 exhibits the color-changing display effect with multilevel transparency. In one example wherein the width of each of the plurality of discrete sub-electrodes is about 7 µm, applying a ±15 V driving voltage results in the response time of the multilevel transparency switching (e.g., from the dark state to the bright state) of about 5 s.

In some examples, a distance 204 between the first substrate 21 and the second substrate 22 may be greater than or equal to 10 nm and less than or equal to 20 µm. For example, the distance 204 may be 15 µm.

In some examples, the particles 23 may include one or more of organic pigment particles and inorganic pigment particles. In examples wherein the particles 23 include inorganic pigment particles, the display panel 26 may have improved environmental reliability and an extended life (as compared to, for example, a conventional dye liquid crystal color-changing glass, such as the conventional dye liquid crystal color-changing glass 701 as described above with reference to FIG. 7).

Figure 3:
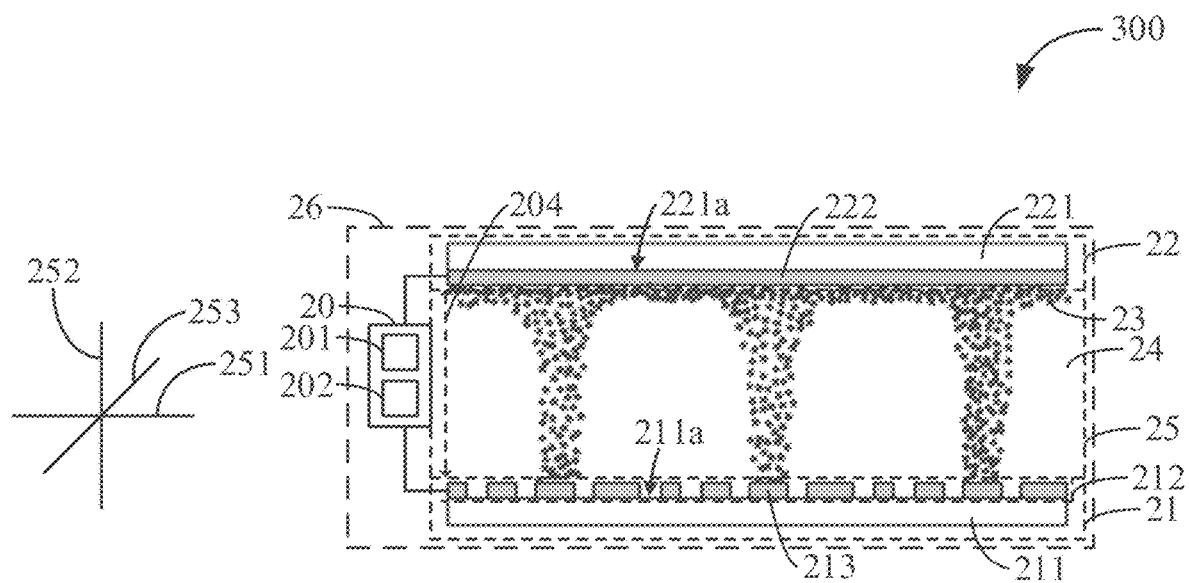
FIG. 3 shows a schematic structural diagram of the display panel during a particle agglomeration process according to an embodiment of the present disclosure.
Figure 4:
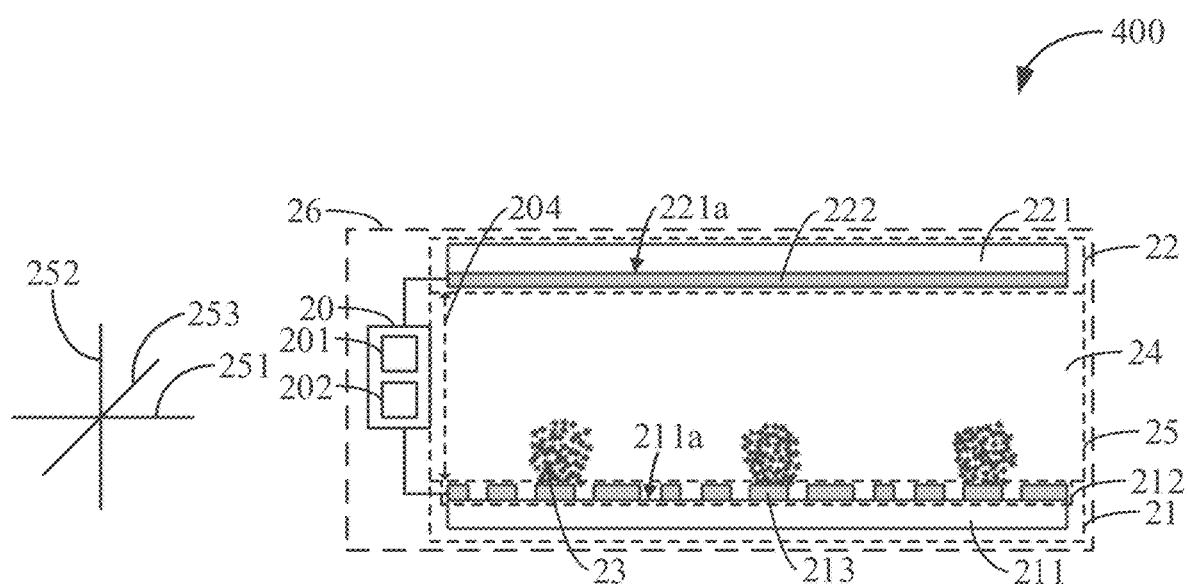
FIG. 4 shows a schematic structural diagram of the display panel in a bright state according to an embodiment of the present disclosure.

Thus, the display panel 26 provided by the embodiment depicted in FIGS. 2-4 has a faster response time than a conventional electrochromic glass device (such as the conventional electrochromic glass 101 as described above with reference to FIG. 1), thereby improving user experience. Further, as compared with a conventional dye liquid crystal color-changing glass (such as the conventional dye liquid crystal color-changing glass 701 as described above with reference to FIG. 7), a control process is simpler, a cost is lower, and a larger number of colors, such as black, white, yellow, cyan, and magenta, may be displayed. Further, since the display panel 26 has such multilevel transparency switching capabilities, the display panel 26 may have a wide range of applications, and may, for example, be applied to products such as window glass, vehicle glass, lampshade glass, greenhouse glass, dimming glass, etc.

Figure 5:
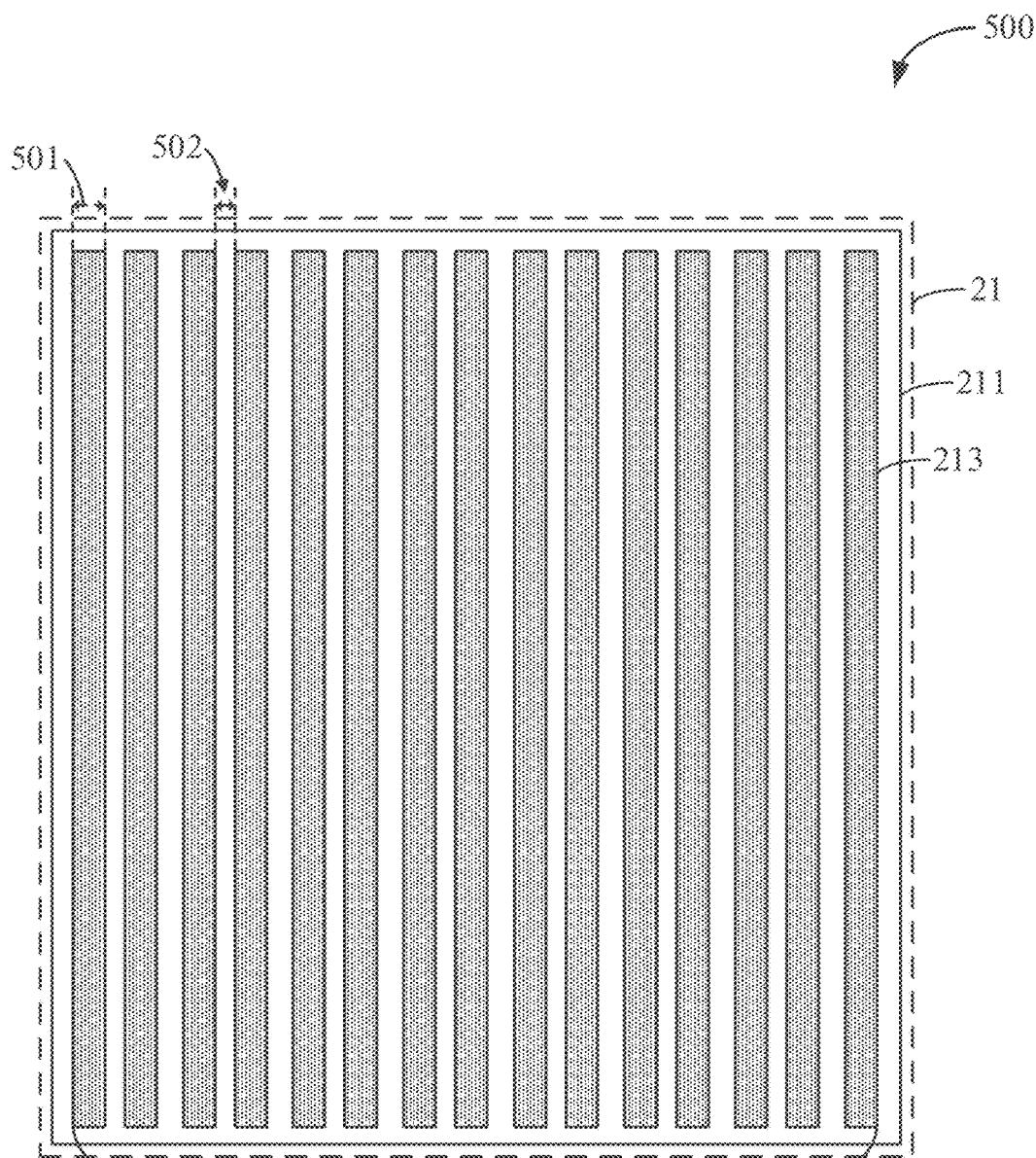
FIG. 5 shows a top view of a first example of a first substrate of the display panel of FIGS. 2-4.
Figure 5:
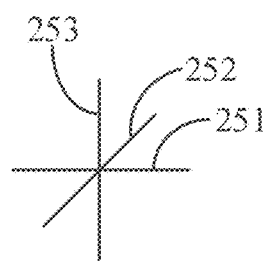

Referring now to FIG. 5, a top view 500 depicts a first example of the first substrate 21 of the display panel 26. As shown in the top view 500, the first substrate 21 may include the first base substrate 211 and the first electrode 212, where the first electrode 212 may include the plurality of discrete sub-electrodes 213. Further, and as shown in the top view 500, each of the plurality of discrete sub-electrodes 213 may be equal in a width 501 and may be equally spaced from one another, that is, each of the discrete sub-electrodes 213 may be equal in a distance 502 from one another.

Figure 6:
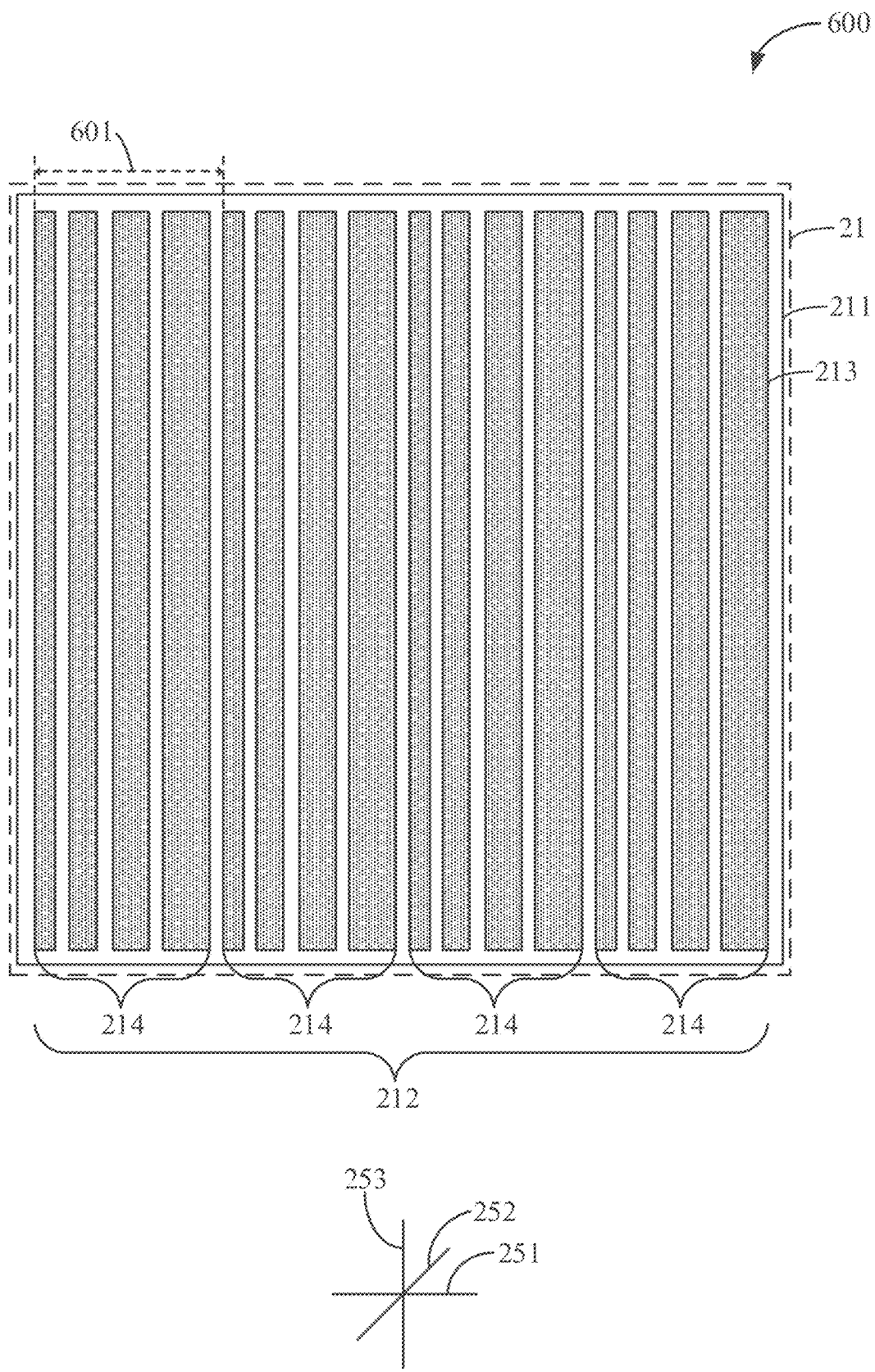
FIG. 6 shows a top view of a second example of the first substrate of the display panel of FIGS. 2-4.

Referring now to FIG. 6, a top view 600 depicts a second example of the first substrate 21 of the display panel 26. As shown in the top view 600, the first substrate 21 may include the first base substrate 211 and the first electrode 212, where the first electrode 212 may include a plurality of periodically arranged electrode groups 214. Each of the plurality of periodically arranged electrode groups 214 are discrete and may include a subset of the plurality of discrete sub-electrodes 213, where each of the subset of the plurality of discrete sub-electrodes 213 is equal, or substantially equal, in distance (e.g., 502) from one another and different in width (e.g., 501) from one another. However, as shown in the top view 600, each of the plurality of periodically arranged electrode groups 214 may be equal in a pitch 601.

Referring now to FIGS. 5 and 6, in practical applications, in order to reduce a likelihood of a human eye recognizing bright and dark stripes exhibited by the particles (e.g., 23) in the bright state (e.g., when the particles 23 gather onto at least one of the plurality of discrete sub-electrodes 213), the width 501 of each of the plurality of discrete sub-electrodes 213 may be set to be less than or equal to a preset threshold. Further, the preset threshold may be determined according to specific conditions, such as a material of the plurality of discrete sub-electrodes and a size of the display panel (e.g., 26).

Since a length of 15 µm or less is not visible to the human eye, the width 501 of each of the plurality of discrete sub-electrodes 213 may be correspondingly set to be less than or equal to 15 µm. As such, even if the bright and dark stripes appear, the human eye will not be able to recognize said stripes, as the display panel 26 will be in a macroscopically bright/transparent state. For example, the width 501 may be 4 µm, 6 µm, 8 µm, 10 µm, 12 µm, etc. Similarly, the distance 502 may be less than or equal to 15 µm.

As shown in the top view 600, the plurality of discrete sub-electrodes 213 in the first electrode 212 may be periodically arranged. That is, the first electrode 212 may include the plurality of periodically arranged electrode groups 214. In the example depicted by the top view 600, each of the plurality of periodically arranged electrode groups 214 may include four of the plurality of discrete sub-electrodes 213. In one example, each of the four of the plurality of discrete sub-electrodes 213 may have a different width 501, such as 4 µm, 6 µm, 8 µm, and 10 µm, respectively. That is, the widths 501 of the plurality of discrete sub-electrodes 213 within a given electrode group 214 may sequentially increase by an equal difference (e.g., 2 µm). Further, each of the four of the plurality of discrete sub-electrodes 213 may be spaced apart from one another with distance 502 of 3 µm, and the pitch 601 of each of the plurality of periodically arranged electrode groups 214 may be 40 µm.

In some examples, in the bright state of the display panel 26, a voltage may be selectively applied to at least one of the plurality of discrete sub-electrodes 213, and a positive electric field may be generated between each of the at least one of the plurality of discrete sub-electrodes 213 to which the voltage is applied and the second electrode 222, such that display states corresponding to multilevel transparency may be realized. Various non-limiting examples together constituting such multilevel transparency are now provided below. In the following non-limiting examples, each of the example discrete sub-electrodes 213 may be described with reference to a subset of the plurality of discrete sub-electrodes 213 included in a given periodically arranged electrode group 214. Further, the pitch 601 of the given periodically arranged electrode group 214 corresponding to the following non-limiting examples may be calculated as 3 µm*4+4 µm+6 µm+8 µm+10 µm=40 µm.

In a first example, controlling application of the voltage across a given discrete sub-electrode 213 having the width 501 of 4 µm may result in 90% transmittance.

In a second example, controlling application of the voltage across a given discrete sub-electrode 213 having the width 501 of 8 µm may result in 80% transmittance.

In a third example, controlling application of the voltage across two given discrete sub-electrodes 213 having the widths 501 of 4 µm and 8 µm, respectively, may result in 70% transmittance.

In a fourth example, controlling application of the voltage across two given discrete sub-electrodes 213 having the widths 501 of 6 μm and 10 μm, respectively, may result in 60% transmittance.

In a fifth example, controlling application of the voltage across three given discrete sub-electrodes 213 having the widths 501 of 4 μm, 6 μm, and 10 μm, respectively, may result in 50% transmittance.

In a sixth example, controlling application of the voltage across three given discrete sub-electrodes 213 having the widths 501 of 6 μm, 8 μm, and 10 μm, respectively, may result in 40% transmittance.

In a seventh example, controlling application of the voltage across four given discrete sub-electrodes 213 having the widths 501 of 4 μm, 6 μm, 8 μm, and 10 μm, respectively, may result in 30% transmittance.

Calculation of transmittance in the above non-limiting examples are now provided below.

In the first example, the given discrete sub-electrode 213 having the width 501 of 4 μm is energized such that the particles 23 are all, or substantially all, concentrated on the given discrete sub-electrode 213. As such, a region surrounding the given discrete sub-electrode 213 is opaque and has a width of 4 μm and a remaining region of the corresponding periodically arranged electrode group 214 transmits light and has a width of 36 μm. Thus, the transmittance is (36 μm/40 μm)*100=90% (accounting for the pitch 601 of said periodically arranged electrode group 214).

In the second example, the given discrete sub-electrode 213 having the width 501 of 8 μm is energized such that the particles 23 are all, or substantially all, concentrated on the given discrete sub-electrode 213. As such, a region surrounding the given discrete sub-electrode 213 is opaque and has a width of 8 μm and a remaining region of the corresponding periodically arranged electrode group 214 transmits light and has a width of 32 μm. Thus, the transmittance is (32 μm/40 μm)*100=80% (accounting for the pitch 601 of said periodically arranged electrode group 214).

In the third example, the two given discrete sub-electrode 213 having the widths 501 of 4 μm and 8 μm, respectively, are energized such that the particles 23 are all, or substantially all, concentrated on the two given discrete sub-electrodes 213. As such, a region surrounding the two given discrete sub-electrodes 213 is opaque and has a total width of 12 μm and a remaining region of the corresponding periodically arranged electrode group 214 transmits light and has a width of 28 μm. Thus, the transmittance is (28 μm/40 μm)*100=70% (accounting for the pitch 601 of said periodically arranged electrode group 214).

In the fourth example, the two given discrete sub-electrode 213 having the widths 501 of 6 μm and 10 μm, respectively, are energized such that the particles 23 are all, or substantially all, concentrated on the two given discrete sub-electrodes 213. As such, a region surrounding the two given discrete sub-electrodes 213 is opaque and has a total width of 16 μm and a remaining region of the corresponding periodically arranged electrode group 214 transmits light and has a width of 24 μm. Thus, the transmittance is (24 μm/40 μm)*100=60% (accounting for the pitch 601 of said periodically arranged electrode group 214).

In the fifth example, the three given discrete sub-electrode 213 having the widths 501 of 4 μm, 6 μm, and 10 μm, respectively, are energized such that the particles 23 are all, or substantially all, concentrated on the three given discrete sub-electrodes 213. As such, a region surrounding the three given discrete sub-electrodes 213 is opaque and has a total width of 20 μm and a remaining region of the corresponding periodically arranged electrode group 214 transmits light and has a width of 20 μm. Thus, the transmittance is (20 μm/40 μm)*100=50% (accounting for the pitch 601 of said periodically arranged electrode group 214).

In the sixth example, the three given discrete sub-electrode 213 having the widths 501 of 6 μm, 8 μm, and 10 μm, respectively, are energized such that the particles 23 are all, or substantially all, concentrated on the three given discrete sub-electrodes 213. As such, a region surrounding the three given discrete sub-electrodes 213 is opaque and has a total width of 24 μm and a remaining region of the corresponding periodically arranged electrode group 214 transmits light and has a width of 16 μm. Thus, the transmittance is (16 μm/40 μm)*100=40% (accounting for the pitch 601 of said periodically arranged electrode group 214).

In the seventh example, the four given discrete sub-electrode 213 having the widths 501 of 4 μm, 6 μm, 8 μm, and 10 μm, respectively, are energized such that the particles 23 are all, or substantially all, concentrated on the four given discrete sub-electrodes 213. As such, a region surrounding the four given discrete sub-electrodes 213 is opaque and has a total width of 28 μm and a remaining region of the corresponding periodically arranged electrode group 214 transmits light and has a width of 12 μm. Thus, the transmittance is (12 μm/40 μm)*100=30% (accounting for the pitch 601 of said periodically arranged electrode group 214).

In a further example, wherein the display panel 26 is in the dark state, none of the discrete sub-electrodes 213 of the above non-limiting examples are energized, such that the particles 23 are uniformly distributed between the first electrode 212 and the second electrode 222, and the display panel 26 is completely dark (e.g., resulting in 0% transmittance).

It will be appreciated that voltages may be arbitrarily combined and applied between the discrete sub-electrodes 213 of the above non-limiting examples, thereby realizing the display states corresponding to multilevel transparency.

Thus, the embodiment of the display panel 26 as described above with reference to FIGS. 2-6 may have a wide range of applications. In one example, the display panel 26 may be applied to a greenhouse glass, where the transmittance, or an amount of light allowed through, the greenhouse glass may be properly adjusted to meet lighting needs of different flower, fruits, vegetables, and other plants. In another example, the display panel 26 may be applied to a window glass, where the window glass may function similar to blinds, adjusting an amount of light entering an indoor space according to an outdoor light intensity. In another example, the display panel 26 may be applied to a lampshade glass, or light source cover, where an apparent light intensity of a lamp may be adjusted as needed (according to, for example, an ambient indoor light), or the lampshade glass may function as a colored glass to provide a desired aesthetic design to said lamp. In another example, the display panel 26 may be applied to a vehicle glass, where the vehicle glass may have only two states (e.g., a transparent, or bright, state and a dark state). As such, the display panel 26 may be applied to a dimming glass, and may provide functionality to suit specific applications thereof.

Further, as compared to a conventional electrochromic glass device (such as the conventional electrochromic glass 101 as described above with reference to FIG. 1), the display panel 26 provided by an embodiment of the present disclosure may have a lower cost and a faster response time.

Further, as compared to a conventional dye liquid crystal color-changing glass (such as the conventional dye liquid crystal color-changing glass 701 as described above with reference to FIG. 7), the display panel 26 provided by an embodiment of the present disclosure may have a relatively simple control process, a lower cost, and a larger number of colors may be displayed.

Further, the display panel 26 provided by an embodiment of the present disclosure may have multilevel transparency switching capabilities, thereby suiting a wide range of applications.

Figure 8:
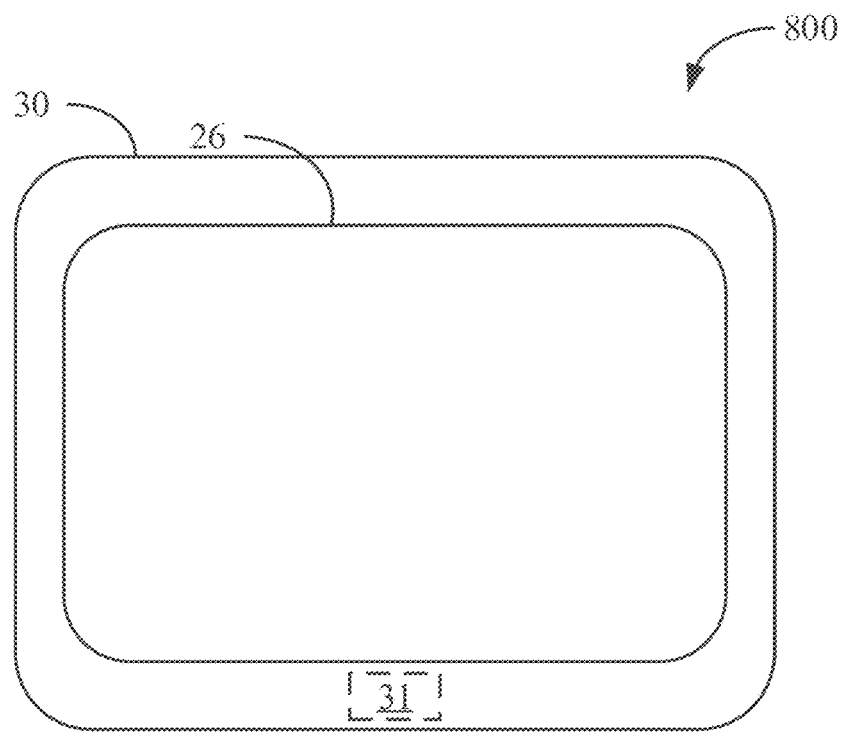
FIG. 8 shows a schematic structural diagram of a display device according to an embodiment of the present disclosure.

Further, and as will be described below with reference to FIG. 8, a display device is provided by an embodiment of the present disclosure, which may include the display panel of any of the above embodiments. Referring now to FIG. 8, a schematic structural diagram 800 depicts a display device 30 including the display panel 26. The display device 30 may further include a power supplying circuit 31.

It will be appreciated that the display device 30 of this embodiment may be any product or component having a display function, such as an electronic paper, a mobile phone, a tablet computer, a television, a notebook computer, a digital photo frame, a navigator (e.g., a global positioning system), etc.

Further, and as will be described below with reference to FIGS. 9-12, methods of controlling the display panel are provided by an embodiment of the present disclosure, which may be applied to the display panel of any of the above embodiments. It should be understood that elements of the described methods of FIGS. 9-12 may be combined with one another to obtain more specific embodiments. For example, and as described below, aspects of the method described with reference to FIG. 12 may be respectively utilized in the methods described with reference to FIGS. 9-11.

Figure 9:
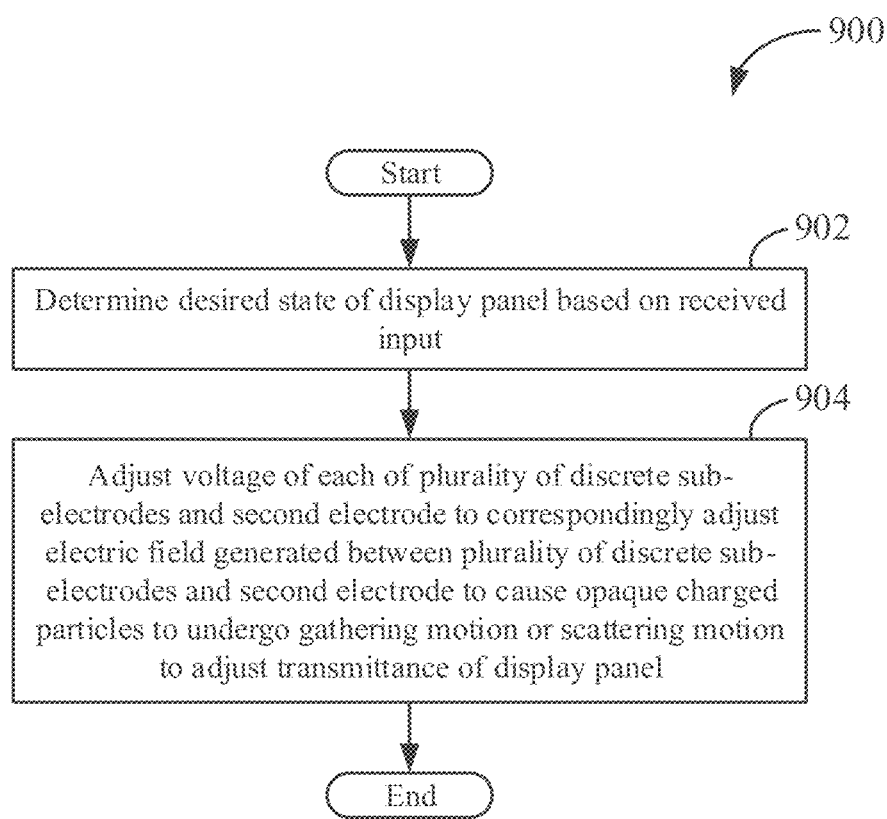
FIG. 9 shows a flow diagram of a first method of controlling particles in the display panel according to an embodiment of the present disclosure.

Referring now to FIG. 9, a flow diagram 900 depicts a first method of controlling opaque charged particles (e.g., 23) in the display panel (e.g., 26). The first method will be described with reference to the systems described herein, though it may be understood that similar methods may be applied to other systems without departing from the scope of the present disclosure. Further, in some examples, steps of the first method depicted at FIG. 9 may be carried out via the controller (e.g., 20), and may be stored at the controller as executable instructions in non-transitory memory (e.g., 202).

At 902, the first method may include determining a desired state of the display panel (e.g., 26) based on a received input. In some examples, the received input may be provided by a user of the display panel. In some examples, the received input may be an environmental stimulus, such as an amount of light detected by the display panel. In some examples, the received input may be received directly from the non-transitory memory (e.g., 202) as preprogrammed executable instructions.

At 904, the first method may include adjusting the voltage of each of the plurality of discrete sub-electrodes (e.g., 213) and the second electrode (e.g., 222), where an electric field may be generated between each of the plurality of discrete sub-electrodes and the second electrode may be correspondingly adjusted to cause the opaque charged particles (e.g., 23) to undergo a gathering motion or a scattering motion to adjust the transmittance of the display panel (e.g., 26).

Figure 10:
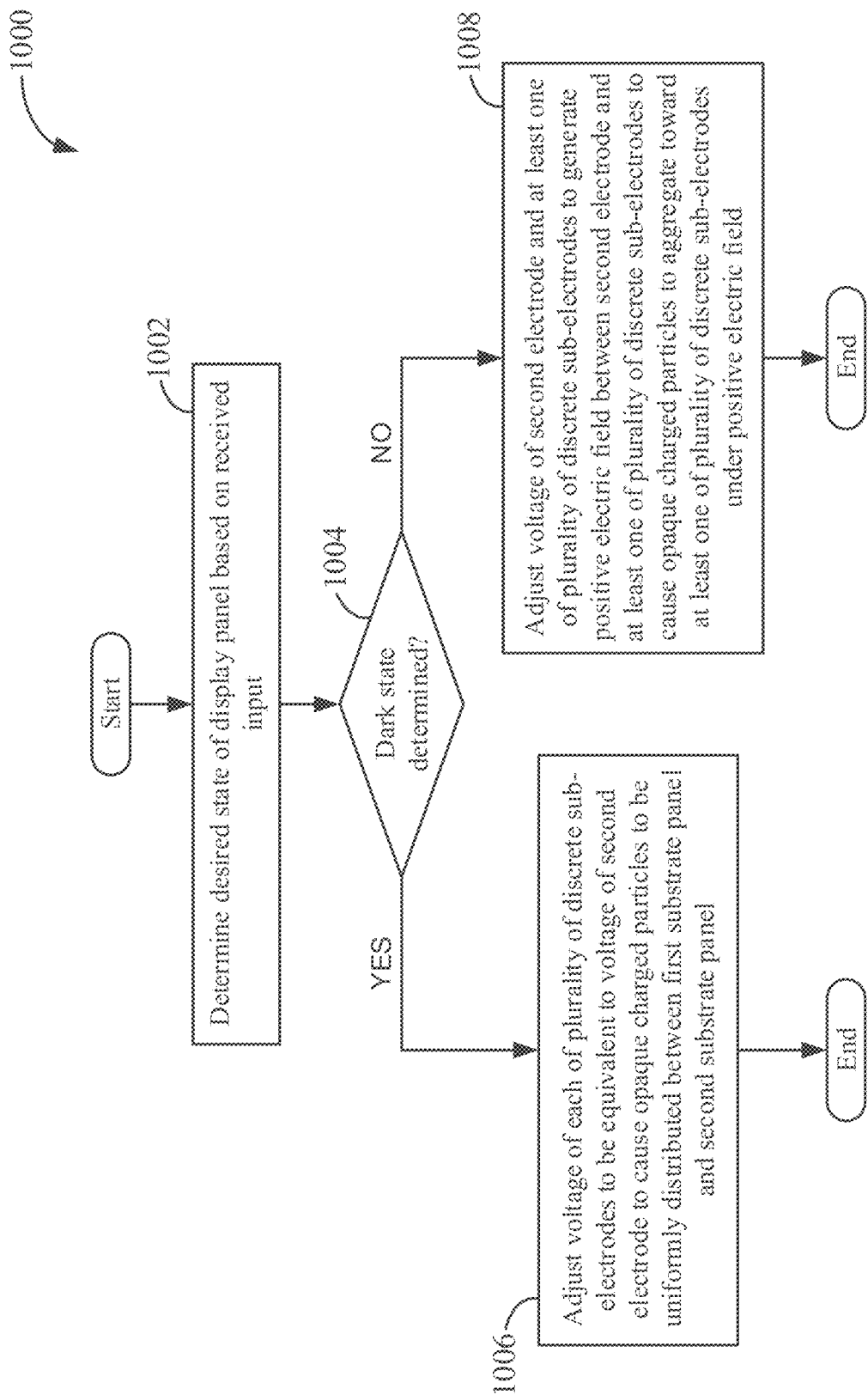
FIG. 10 shows a flow diagram of a second method of controlling particles in the display panel according to an embodiment of the present disclosure.

Referring now to FIG. 10, a flow diagram 1000 depicts a second method of controlling opaque charged particles (e.g., 23) in the display panel (e.g., 26). The second method will be described with reference to the systems described herein, though it may be understood that similar methods may be applied to other systems without departing from the scope of the present disclosure. In some examples, the second method may be included in a specific implementation of the first method as described with reference to FIG. 9. Further, in some examples, steps of the second method depicted at FIG. 10 may be carried out via a controller (e.g., 20), and may be stored at the controller as executable instructions in non-transitory memory (e.g., 202).

At 1002, the second method may include determining a desired state of the display panel (e.g., 26) based on a received input. In some examples, the received input may be provided by a user of the display panel. In some examples, the received input may be an environmental stimulus, such as an amount of light detected by the display panel. In some examples, the received input may be received directly from the non-transitory memory (e.g., 202) as preprogrammed executable instructions.

At 1004, the second method may include confirming whether the desired state of the display panel (e.g., 26) is a dark state.

If the desired state of the display panel (e.g., 26) is confirmed to be the dark state, the second method may include proceeding to 1006 to adjust the voltage of each of the plurality of discrete sub-electrodes (e.g., 213) to be equivalent to the voltage of the second electrode (e.g., 222), causing the opaque charged particles (e.g., 23) to be uniformly distributed between the first substrate (e.g., 21) and the second substrate (e.g., 22). The second method may then end.

If the desired state of the display panel (e.g., 26) is not confirmed to be the dark state, that is, if the desired state of the display panel is determined to be the bright state, the second method may include proceeding to 1008 to adjust the voltage of the second electrode (e.g., 222) and at least one of the plurality of discrete sub-electrodes (e.g., 213) to generate a positive electric field between the second electrode and the at least one of the plurality of discrete sub-electrodes, causing the opaque charged particles (e.g., 23) to aggregate toward the at least one of the plurality of discrete sub-electrodes under the positive electric field. The second method may then end.

Figure 11:
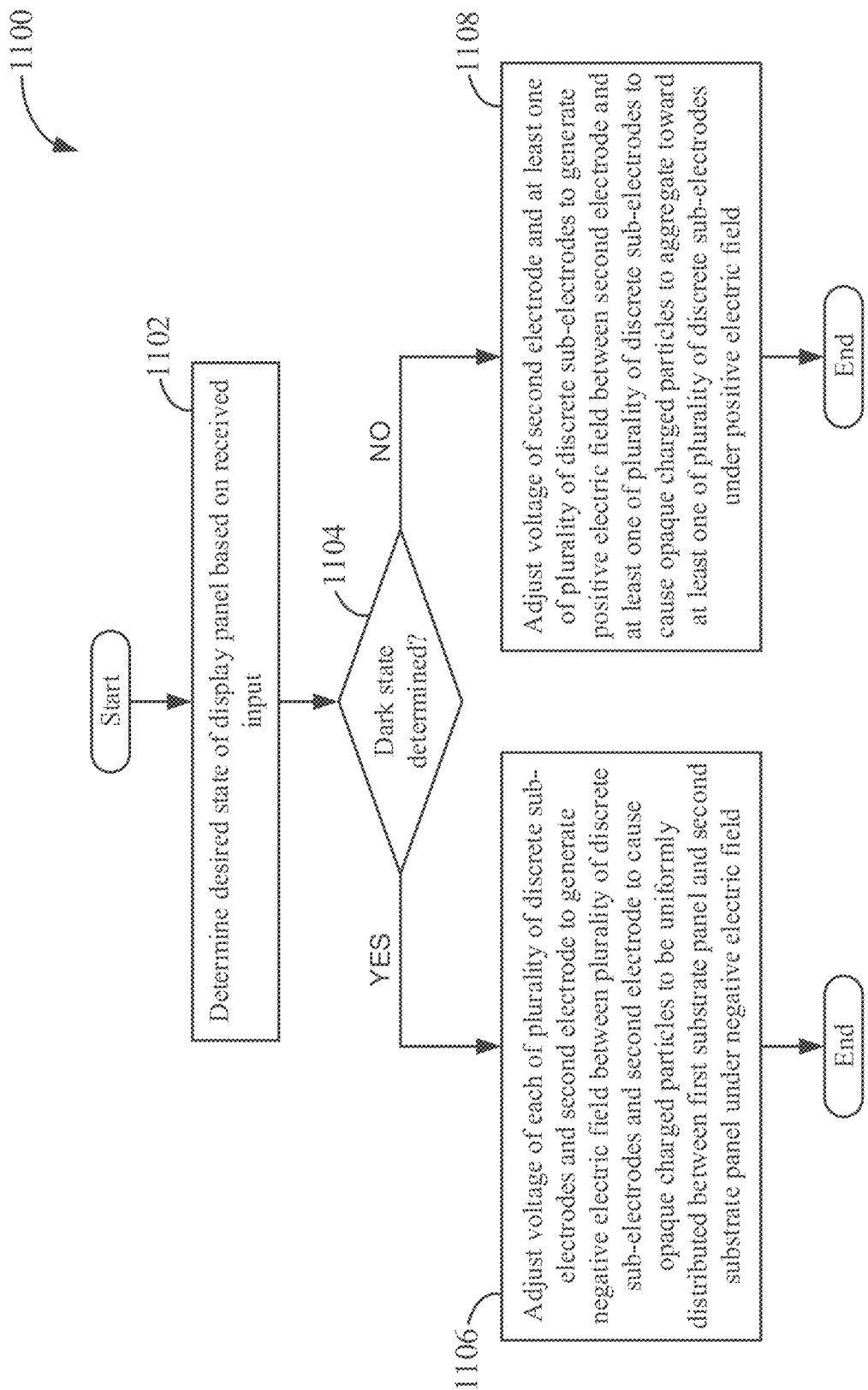
FIG. 11 shows a flow diagram of a third method of controlling particles in the display panel according to an embodiment of the present disclosure.

Referring now to FIG. 11, a flow diagram 1100 depicts a third method of controlling opaque charged particles (e.g., 23) in the display panel (e.g., 26). The third method will be described with reference to the systems described herein, though it may be understood that similar methods may be applied to other systems without departing from the scope of the present disclosure. In some examples, the third method may be included in a specific implementation of the first method as described with reference to FIG. 9. Further, in some examples, steps of the third method depicted at FIG. 11 may be carried out via a controller (e.g., 20), and may be stored at the controller as executable instructions in non-transitory memory (e.g., 202).

At 1102, the third method may include determining a desired state of the display panel (e.g., 26) based on a received input. In some examples, the received input may be provided by a user of the display panel. In some examples, the received input may be an environmental stimulus, such as an amount of light detected by the display panel. In some examples, the received input may be received directly from the non-transitory memory (e.g., 202) as preprogrammed executable instructions.

At 1104, the third method may include confirming whether the desired state of the display panel (e.g., 26) is a dark state.

If the desired state of the display panel (e.g., 26) is confirmed to be the dark state, the third method may include proceeding to 1106 to adjust the voltage of each of the plurality of discrete sub-electrodes (e.g., 213) and the second electrode (e.g., 222) to generate a negative electric field between each of the plurality of discrete sub-electrodes and the second electrode to cause the opaque charged particles (e.g., 23) to be uniformly distributed between the first substrate (e.g., 21) and the second substrate (e.g., 22) under the negative electric field. The third method may then end.

If the desired state of the display panel (e.g., 26) is not confirmed to be the dark state, that is, if the desired state of the display panel is determined to be the bright state, the third method may include proceeding to 1108 to adjust the voltage of the second electrode (e.g., 222) and at least one of the plurality of discrete sub-electrodes (e.g., 213) to generate a positive electric field between the second electrode and the at least one of the plurality of discrete sub-electrodes to cause the opaque charged particles (e.g., 23) to aggregate toward the at least one of the plurality of discrete sub-electrodes under the positive electric field. The third method may then end.

Figure 12:
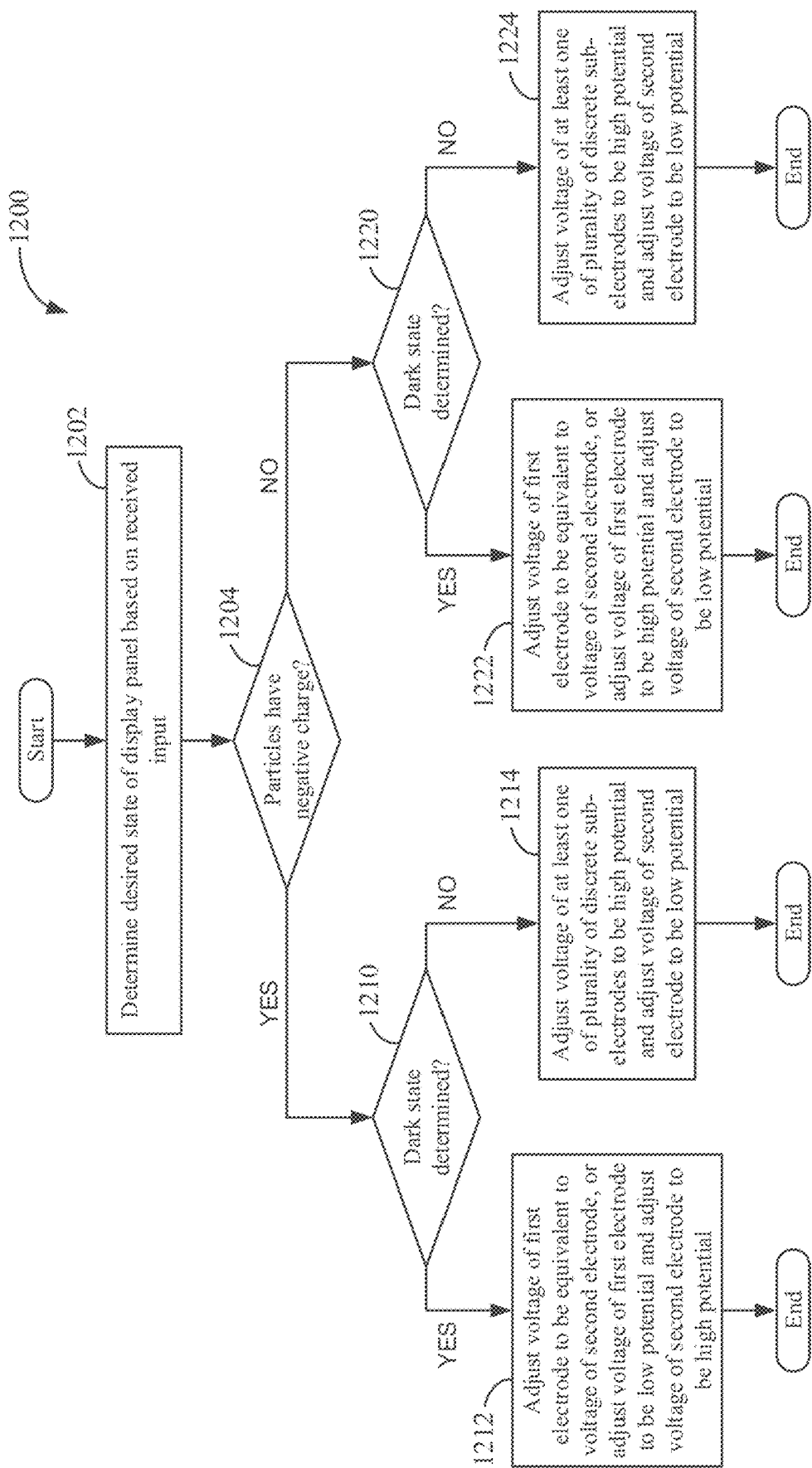
FIG. 12 shows a flow diagram of a method of adjusting voltages of various electrodes in the display panel.

Referring now to FIG. 12, a flow diagram 1200 depicts a method of adjusting voltages of various electrodes in the display panel (e.g., 26). The method will be described with reference to the systems described herein, though it may be understood that similar methods may be applied to other systems without departing from the scope of the present disclosure. In some examples, the method provided by the flow diagram 1200 may be included in a specific implementation of one of the first method of controlling the opaque charged particles (e.g., 23) as described with reference to FIG. 9, the second method of controlling the opaque charged particles as described with reference to FIG. 10, and the third method of controlling the opaque charged particles as described with reference to FIG. 11. Further, in some examples, steps of the method depicted at FIG. 12 may be carried out via a controller (e.g., 20), and may be stored at the controller as executable instructions in non-transitory memory (e.g., 202).

At 1202, the method may include determining a desired state of the display panel (e.g., 26) based on a received input. In some examples, the received input may be provided by a user of the display panel. In some examples, the received input may be an environmental stimulus, such as an amount of light detected by the display panel. In some examples, the received input may be received directly from the non-transitory memory (e.g., 202) as preprogrammed executable instructions.

At 1204, the method may include determining whether the opaque charged particles (e.g., 23) have a negative charge.

If the opaque charged particles (e.g., 23) are determined to have a negative charge, the method may include proceeding to 1210 to confirm whether the desired state of the display panel (e.g., 26) is a dark state.

If the desired state of the display panel (e.g., 26) is confirmed to be the dark state, the method includes proceeding to 1212 to adjust the voltage of the first electrode (e.g., 212) to be equivalent to the voltage of the second electrode (e.g., 222), or adjust the voltage of the first electrode to be a low potential and adjust the voltage of the second electrode to be a high potential. The method may then end.

If the desired state of the display panel (e.g., 26) is not confirmed to be the dark state, that is, if the desired state of the display panel is determined to be the bright state, the method includes proceeding to 1214 to adjust the voltage of at least one of the plurality of discrete sub-electrodes (e.g., 213) to be a high potential and adjust the voltage of the second electrode (e.g., 222) to be a low potential. The method may then end.

If the opaque charged particles (e.g., 23) are not determined to have a negative charge, that is, if the opaque charged particles are determined to have a positive charge, the method may include proceeding to 1220 to confirm whether the desired state of the display panel (e.g., 26) is a dark state.

If the desired state of the display panel (e.g., 26) is confirmed to be the dark state, the method includes proceeding to 1222 to adjust the voltage of the first electrode (e.g., 212) to be equivalent to the voltage of the second electrode (e.g., 222), or adjust the voltage of the first electrode to be a high potential and adjust the voltage of the second electrode to be a low potential. The method may then end.

If the desired state of the display panel (e.g., 26) is not confirmed to be the dark state, that is, if the desired state of the display panel is determined to be the bright state, the method includes proceeding to 1224 to adjust the voltage of at least one of the plurality of discrete sub-electrodes (e.g., 213) to be a low potential and adjust the voltage of the second electrode (e.g., 222) to be a high potential. The method may then end.

It will be apparent to those skilled in the art that the specific steps of the control methods detailed hereinabove with reference to FIGS. 8-11 may refer to corresponding processes/elements in the device embodiments for convenience and brevity of description, details of which are not described herein again.

In this way, a display panel is provided, which may include a first substrate and a second substrate disposed opposite each other, and a solution disposed between the first substrate and the second substrate. The solution may include opaque charged particles in a transparent uncharged liquid. Further, the first substrate may include a first electrode, the first electrode including a plurality of discrete sub-electrodes, and the second substrate may include a second electrode. In some examples, the display panel may further include a controller. As such, the controller may be operable to adjust an electric field between each of the plurality of discrete sub-electrodes and the second electrode, causing the opaque charged particles to undergo a gathering motion or a scattering motion. The technical effect of controlling the opaque charged particles in this manner is that the display panel including the opaque charged particles may exhibit a color-changing display effect with a multilevel transparency. Further, a response time of a multilevel transparency switching may be about 5 s. As such, visual characteristics of a microstructure of a human eye may be matched. Further, the display panel provided by the present disclosure may have a faster response time than a conventional electrochromic glass, thereby improving user experience. Further, the display panel provided by the present disclosure may employ a simpler control process, a lower cost, and display a larger number of colors (e.g., black, white, yellow, cyan, and magenta) than a conventional dye liquid crystal color-changing glass. Further, due to such multilevel transparency switching capabilities, the display panel may have a wide range of applications, and may, for example, be applied to products such as window glass, vehicle glass, lampshade glass, greenhouse glass, dimming glass, etc.

In one example, a display panel, the display panel comprising: a first substrate and a second substrate opposite to each other; and a solution encapsulated between the first substrate and the second substrate; wherein the solution comprises a transparent uncharged liquid and opaque charged particles; the first substrate comprises a first base substrate and a first electrode disposed on a side of the first base substrate closer to the solution, the first electrode including a plurality of discrete sub-electrodes; and the second substrate comprises a second base substrate and a second electrode disposed on a side of the second base substrate closer to the solution.

Optionally, the display panel, wherein each of the plurality of discrete sub-electrodes is equal in width from one another.

Optionally, the display panel, wherein each of the plurality of discrete sub-electrodes is substantially equal in distance from one another.

Optionally, the display panel, wherein the plurality of sub-electrodes is divided into a plurality of electrode groups periodically arranged, and each of the plurality of sub-electrodes in one group is different in width from one another.

Optionally, the display panel, wherein each of the plurality of sub-electrodes in one group is substantially equal in distance from one another.

Optionally, the display panel, wherein the widths of the plurality of discrete sub-electrodes in one group sequentially increase by an equal difference.

Optionally, the display panel, wherein the width of each of the plurality of discrete sub-electrodes is less than or equal to 15 μm.

Optionally, the display panel, wherein the distance of each of the plurality of discrete sub-electrodes from one another is less than or equal to 15 μm.

Optionally, the display panel, wherein a distance between the first substrate and the second substrate is greater than or equal to 10 nm and less than or equal to 20 μm.

Optionally, the display panel, wherein the transparent uncharged liquid comprises ink; and the opaque charged particles comprise pigment particles having a size of 10 nm or more and 1 μm or less.

Optionally, the display panel, wherein the opaque charged particles comprise inorganic pigment particles.

Optionally, the display panel, wherein the opaque charged particles comprise charged molecules and neutral molecules.

Optionally, the display panel, further comprising a controller, wherein the controller is coupled to each of the plurality of discrete sub-electrodes and the second electrode, and is operable to: adjust a voltage of each of the plurality of discrete sub-electrodes and the second electrode, where an electric field generated between each of the plurality of discrete sub-electrodes and the second electrode is correspondingly adjusted to cause the opaque charged particles to undergo a gathering motion or a scattering motion to adjust a transmittance of the display panel.

Optionally, a display device comprising the display panel, and further comprising a power supplying circuit.

Optionally, a method for controlling the display panel, comprising: adjusting the voltage of each of the plurality of discrete sub-electrodes and the second electrode, where the electric field generated between each of the plurality of discrete sub-electrodes and the second electrode is correspondingly adjusted to cause the opaque charged particles to undergo the gathering motion or the scattering motion to adjust the transmittance of the display panel.

Optionally, the method, wherein adjusting the voltage of each of the plurality of discrete sub-electrodes and the second electrode to correspondingly adjust the electric field generated between each of the plurality of discrete sub-electrodes and the second electrode to cause the opaque charged particles to undergo the gathering motion or the scattering motion to adjust the transmittance of the display panel comprises: responsive to a desired state of the display panel being a dark state, adjusting the voltage of each of the plurality of discrete sub-electrodes to be equivalent to the voltage of the second electrode, causing the opaque charged particles to be uniformly distributed between the first substrate and the second substrate; and responsive to the desired state of the display panel being a bright state, adjusting the voltage of the second electrode and at least one of the plurality of discrete sub-electrodes to generate a positive electric field between the second electrode and the at least one of the plurality of discrete sub-electrodes, causing the opaque charged particles to aggregate toward the at least one of the plurality of discrete sub-electrodes under the positive electric field.

Optionally, the method, wherein adjusting the voltage of each of the plurality of discrete sub-electrodes and the second electrode to correspondingly adjust the electric field generated between each of the plurality of discrete sub-electrodes and the second electrode to cause the opaque charged particles to undergo the gathering motion or the scattering motion to adjust the transmittance of the display panel comprises: responsive to a desired state of the display panel being a dark state, adjusting the voltage of each of the plurality of discrete sub-electrodes and the second electrode to generate a negative electric field between each of the plurality of discrete sub-electrodes and the second electrode to cause the opaque charged particles to be uniformly distributed between the first substrate and the second substrate under the negative electric field; and responsive to the desired state of the display panel being a bright state, adjusting the voltage of the second electrode and at least one of the plurality of discrete sub-electrodes to generate a positive electric field between the second electrode and the at least one of the plurality of discrete sub-electrodes to cause the opaque charged particles to aggregate toward the at least one of the plurality of discrete sub-electrodes under the positive electric field.

Optionally, the method, wherein responsive to the opaque charged particles being negatively charged: further responsive to the desired state of the display panel being the dark state: adjusting a voltage of the first electrode to be equivalent to the voltage of the second electrode; or adjusting the voltage of the first electrode to be a low potential and adjusting the voltage of the second electrode to be a high potential; and further responsive to the desired state of the display panel being the bright state: adjusting the voltage of the at least one of the plurality of discrete sub-electrodes to be a high potential and adjusting the voltage of the second electrode to be a low potential.

Optionally, the method, wherein responsive to the opaque charged particles being positively charged: further responsive to the desired state of the display panel being the dark state: adjusting a voltage of the first electrode to be equivalent to the voltage of the second electrode; or adjusting the voltage of the first electrode to be a high potential and adjusting the voltage of the second electrode to be a low potential; and further responsive to the desired state of the display panel being the bright state: adjusting the voltage of the at least one of the plurality of discrete sub-electrodes to be a low potential and adjusting the voltage of the second electrode to be a high potential.

It will be appreciated that the various embodiments of the present disclosure are described in a progressive manner, wherein each embodiment focuses on differences from other embodiments, and similar parts between the various embodiments may be referred to each other.

It will be appreciated that ordinal terms such as "first" and "second" are used merely to distinguish one entity or operation from another entity or operation, and do not necessarily require or imply any such actual relationship or order between these entities or operations.

FIGS. 1-8 show example configurations with relative positioning of the various components described herein. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

It is to be understood that the above embodiments are merely exemplary embodiments employed to explain the principles of the inventive concepts, but the inventive concepts are not limited thereto. Various modifications and improvements can be made by those skilled in the art without departing from the spirit and scope of the disclosure, and such modifications and improvements are also considered to be within the scope of the disclosure.

The invention claimed is:

1. A display panel, the display panel comprising:
a first substrate and a second substrate opposite to each other; and
a solution encapsulated between the first substrate and the second substrate; wherein
the solution comprises a transparent uncharged liquid and opaque charged particles;
the first substrate comprises a first base substrate and a first electrode disposed on a side of the first base substrate closer to the solution, the first electrode including a plurality of discrete sub-electrodes, each of the plurality of discrete sub-electrodes having a width of less than or equal to 15 µm, a distance between each of the plurality of discrete sub-electrodes from one another is less than or equal to 15 µm, one or more first discrete sub-electrodes have a first width and one or more second discrete sub-electrodes have a second width different from the first width, in a bright state, the opaque charged particles aggregate at at least one of the plurality of discrete sub-electrodes, and aggregation of the charged particles at the first discrete sub-electrodes has a different transmittance than aggregation of the charged particles at the second discrete sub-electrodes; and
the second substrate comprises a second base substrate and a second electrode disposed on a side of the second base substrate closer to the solution.

2. The display panel of claim 1, wherein each of the plurality of discrete sub-electrodes is equal in width from one another.

3. The display panel of claim 1, wherein each of the plurality of discrete sub-electrodes is substantially equal in distance from one another.

4. The display panel of claim 1, wherein the plurality of sub-electrodes is divided into a plurality of electrode groups periodically arranged, and each of the plurality of sub-electrodes in one group is different in width from one another.

5. The display panel of claim 1, wherein each of the plurality of sub-electrodes in one group is substantially equal in distance from one another.

6. The display panel of claim 1, wherein the widths of the plurality of discrete sub-electrodes in one group sequentially increase by an equal difference.

7. The display panel of claim 1, wherein a distance between the first substrate and the second substrate is greater than or equal to 10 nm and less than or equal to 20 µm.

8. The display panel of claim 1, wherein
the transparent uncharged liquid comprises ink; and
the opaque charged particles comprise pigment particles having a size of 10 nm or more and 1 µm or less.

9. The display panel of claim 1, wherein the opaque charged particles comprise inorganic pigment particles.

10. The display panel of claim 1, wherein the opaque charged particles comprise charged molecules and neutral molecules.

11. The display panel of claim 1, further comprising a controller, wherein the controller is coupled to each of the plurality of discrete sub-electrodes and the second electrode, and is operable to:
adjust a voltage of each of the plurality of discrete sub-electrodes and the second electrode, where an electric field generated between each of the plurality of discrete sub-electrodes and the second electrode is correspondingly adjusted to cause the opaque charged particles to undergo a gathering motion or a scattering motion to adjust a transmittance of the display panel.

12. A display device, comprising:
a display panel, the display panel comprising a first substrate and a second substrate disposed opposite to each other, and a solution disposed between the first substrate and the second substrate; and
a power supplying circuit; wherein the solution comprises a transparent uncharged liquid and opaque charged particles;

the first substrate comprises a first base substrate and a first electrode disposed on a side of the first base substrate facing the solution, the first electrode including a plurality of discrete sub-electrodes, each of the plurality of discrete sub-electrodes having a width of less than or equal to 15 μm, a distance between each of the plurality of discrete sub-electrodes from one another is less than or equal to 15 μm, one or more first discrete sub-electrodes have a first width and one or more second discrete sub-electrodes have a second width different from the first width, in a bright state, the opaque charged particles aggregate at at least one of the plurality of discrete sub-electrodes, and aggregation of the charged particles at the first discrete sub-electrodes has a different transmittance than aggregation of the charged particles at the second discrete sub-electrodes; and the second substrate comprises a second base substrate and a second electrode disposed on a side of the second base substrate facing to the solution.

13. The display device of claim 12, wherein the display panel further comprises a controller, wherein the controller is coupled to each of the plurality of discrete sub-electrodes and the second electrode, and is operable to:

adjust a voltage of each of the plurality of discrete sub-electrodes and the second electrode, where an electric field generated between each of the plurality of discrete sub-electrodes and the second electrode is correspondingly adjusted to cause the opaque charged particles to undergo a gathering motion or a scattering motion to adjust a transmittance of the display panel.

14. A method for controlling a display panel, comprising:

adjusting a voltage of each of a plurality of discrete sub-electrodes and a second electrode, where an electric field generated between each of the plurality of discrete sub-electrodes and the second electrode is correspondingly adjusted to cause opaque charged particles to undergo a gathering motion or a scattering motion to adjust a transmittance of the display panel;

wherein the display panel comprises:

a controller;

a first substrate and a second substrate disposed opposite to each other; and a solution disposed between the first substrate and the second substrate; wherein the solution comprises a transparent uncharged liquid and the opaque charged particles;

the first substrate comprises a first base substrate and a first electrode disposed on a side of the first base substrate facing the solution, the first electrode including the plurality of discrete sub-electrodes, each of the plurality of discrete sub-electrodes having a width of less than or equal to 15 μm, a distance between each of the plurality of discrete sub-electrodes from one another is less than or equal to 15 μm, one or more first discrete sub-electrodes have a first width and one or more second discrete sub-electrodes have a second width different from the first width, in a bright state, the opaque charged particles aggregate at at least one of the plurality of discrete sub-electrodes, and aggregation of the opaque charged particles at the first discrete sub-electrodes has a different transmittance than aggregation of the charged particles at the second discrete sub-electrodes;

the second substrate comprises a second base substrate and the second electrode disposed on a side of the second base substrate facing the solution; and the controller is coupled to each of the plurality of discrete sub-electrodes and the second electrode, and stores machine-readable instructions in non-transitory memory for executing the method.

15. The method of claim 14, wherein adjusting the voltage of each of the plurality of discrete sub-electrodes and the second electrode to correspondingly adjust the electric field generated between each of the plurality of discrete sub-electrodes and the second electrode to cause the opaque charged particles to undergo the gathering motion or the scattering motion to adjust the transmittance of the display panel comprises:

responsive to a desired state of the display panel being a dark state, adjusting the voltage of each of the plurality of discrete sub-electrodes and the second electrode to generate a negative electric field between each of the plurality of discrete sub-electrodes and the second electrode to cause the opaque charged particles to be uniformly distributed between the first substrate and the second substrate under the negative electric field; and responsive to the desired state of the display panel being a bright state, adjusting the voltage of the second electrode and at least one of the plurality of discrete sub-electrodes to generate a positive electric field between the second electrode and the at least one of the plurality of discrete sub-electrodes to cause the opaque charged particles to aggregate toward the at least one of the plurality of discrete sub-electrodes under the positive electric field.

16. The method of claim 14, wherein responsive to the opaque charged particles being negatively charged:

responsive to a desired state of the display panel being a dark state:

adjusting a voltage of the first electrode to be equivalent to the voltage of the second electrode; or adjusting the voltage of the first electrode to be a low potential and adjusting the voltage of the second electrode to be a high potential; and responsive to the desired state of the display panel being a bright state:

adjusting a voltage of at least one of the plurality of discrete sub-electrodes to be a high potential and adjusting the voltage of the second electrode to be a low potential.

17. The method of claim 14, wherein responsive to the opaque charged particles being positively charged:

responsive to a desired state of the display panel being a dark state:

adjusting a voltage of the first electrode to be equivalent to the voltage of the second electrode; or adjusting the voltage of the first electrode to be a high potential and adjusting the voltage of the second electrode to be a low potential; and responsive to the desired state of the display panel being a bright state:

adjusting a voltage of at least one of the plurality of discrete sub-electrodes to be a low potential and adjusting the voltage of the second electrode to be a high potential.

18. The method of claim 14, wherein adjusting the voltage of each of the plurality of discrete sub-electrodes and the second electrode to correspondingly adjust the electric field generated between each of the plurality of discrete sub-electrodes and the second electrode to cause the opaque charged particles to undergo the gathering motion or the scattering motion to adjust the transmittance of the display panel comprises:

responsive to a desired state of the display panel being a dark state, adjusting the voltage of each of the plurality of discrete sub-electrodes to be equivalent to the voltage of the second electrode, causing the opaque charged particles to be uniformly distributed between the first substrate and the second substrate; and responsive to the desired state of the display panel being a bright state, adjusting the voltage of the second electrode and at least one of the plurality of discrete sub-electrodes to generate a positive electric field between the second electrode and the at least one of the plurality of discrete sub-electrodes, causing the opaque charged particles to aggregate toward the at least one of the plurality of discrete sub-electrodes under the positive electric field.

19. The display panel of claim 14, wherein the width of the first discrete sub-electrodes is 4 μm and aggregation of the charged particles at the first discrete sub-electrodes has 90% transmittance.

* * * * *